United States Patent [19]

Toyosato

[11] Patent Number: 4,481,875
[45] Date of Patent: Nov. 13, 1984

[54] BULB PEELING APPARATUS

[75] Inventor: Kaku Toyosato, Yokohama, Japan

[73] Assignee: M.G.I. Co., Ltd., Kanagawa, Japan

[21] Appl. No.: 446,571

[22] Filed: Dec. 3, 1982

[51] Int. Cl.³ .................. A23N 7/00; A23N 15/08
[52] U.S. Cl. ...................................... 99/584; 83/877;
83/884; 99/516; 99/591; 99/593
[58] Field of Search .................. 99/485, 516, 534–536,
99/537–540, 567, 591, 584–589, 593–595,
574–576; 426/482, 483; 83/866, 867, 870, 872,
873, 875–877, 883, 884, 886, 887

[56] References Cited

U.S. PATENT DOCUMENTS 1,878,423  9/1932  Nowlin ............................. 99/576
4,321,865  3/1982  Ramseier ......................... 99/576

FOREIGN PATENT DOCUMENTS 56-104395  8/1981  Japan .
56-104396  8/1981  Japan .

*Primary Examiner*—Timothy F. Simone
*Attorney, Agent, or Firm*—Armstrong, Nikaido, Marmelstein & Kubovcik

[57] ABSTRACT

Here is disclosed a bulb peeling apparatus wherein a means of incising grooves on the outer peripheral surface skins of bulbs while rotating the bulbs is arranged in the course of a bulb conveying means and a compressed air blowing means is arranged further in the rear of the groove incising means so as to peel off the surface skins.

It is positive to manually peel off surface skins of bulbs. However, in order to peel off the surface skins of a large volume of bulbs, the rise of the labor and production costs will be inevitable and a mechanical means will have to be naturally resorted to.

In the bulb peeling apparatus of the present invention, a means of forming incised grooves on the outer peripheral surface skins of bulbs while rotating the bulbs is provided in the course of a bulb conveying means so as to peel off the surface skins of a large volume of bulbs.

10 Claims, 6 Drawing Figures

BULB PEELING APPARATUS

BACKGROUND OF THE INVENTION

This invention relates to a bulb peeling apparatus wherein incised grooves are formed on the outer peripheral surface skins of bulbs while rotating the bulbs and air is jetted onto the bulbs to peel off the surface skins.

Generally such bulbs as of onions or garlics are favored as cooking materials. However, when they are to be finely cut for concrete uses, their surfaces will have to be peeled off. In case a large volume is to be worked, the manual work will be positive but will be toilsome, the rise of costs will be inevitable and therefore a mechanical means will have to be naturally resorted to.

For the means of peeling off the surface skins of bulbs, it has been most effective to jet compressed air. In the peeling process in the apparatus provided with this means, such bulbs as, for example, of onions mounted and conveyed on a conveying part have compressed air jetted onto them to peel off the surface skins, are finely cut through a finely cutting step, further have jetted air applied to them to be peeled and are used as cooking material.

However, when compressed air is thus only blown without making incised grooves on the outer peripheral surface skins of the bulbs, there will be such defects as are in the following.

That is to say, in case compressed air is blown onto such bulbs as of onions to peel off the surface skins, unless the positions of the nozzles are at proper distances above the onion bulb side, the bulbs will not be positively peeled.

There is a prior art example wherein the above mentioned distances can be steppedly adjusted in response to the bulbs divided depending on the sizes. However, therein, in case a large volume is to be handled, it will be very difficult to set the nozzles in positions proper for peeling and the peeling apparatus will be low in the reliability.

Therefore, there is another prior art example wherein incisions or incised grooves are formed on the outer peripheral surface skins of onions with blades located on the periphery of a hole through which the onions are to be passed and then compressed air is blown onto them. However, in this prior art example, unless the sizes of the respective onions are well arranged, the onions will not be able to be peeled efficiently and the apparatus will not be adapted to treat a large volume.

Therefore, there is a prior art example disclosed in the Gazette of Japanese Utility Model Laid Open No. 104395/1981 wherein a large volume of onions can be peeled.

However, in the above mentioned prior art example, onions conveyed by a belt conveyer will contact usually on the root sides with the belt conveyer, therefore, after they are conveyed, in case incised grooves are to be formed with first and second rotary cutter devices, the respective onions will not rotate smoothly and the incised grooves will not be formed over the outer peripheries of the onions but will be formed only in the same places or locally on the onions. Therefore, the onions will not be positively peeled and the apparatus will be low in the reliability.

Further, there is a prior art example disclosed in the Gazette of Japanese Utility Model Laid Open No. 104396/1981 wherein grooves to contain onions are spirally provided on the peripheral surface of a cylindrical net and blades are arranged inside these grooves so as to form incised grooves with these blades. However, it is difficult to vary the heights of the blades for different thicknesses of the surface skins of the onions and the speed of peeling a large volume of onions can not be said to be sufficient.

BRIEF DESCRIPTION OF THE DRAWINGS

FIGS. 1 to 6 relate to an embodiment of the present invention.

BRIEF SUMMARY OF THE INVENTION

An object of the present invention is to provide a bulb peeling apparatus wherein the surface skins of bulbs can be positively peeled off.

Another object of the present invention is to provide a bulb peeling apparatus wherein the surface skins of bulbs can be peeled off within a short time or at a high speed.

A further object of the present invention is to provide a bulb peeling apparatus adapted to peel off the surface skins of a large volume of bulbs.

Other objects and advantages of the present invention will become apparent enough by the following description.

DETAILED DESCRIPTION OF THE INVENTION

Figure 1:
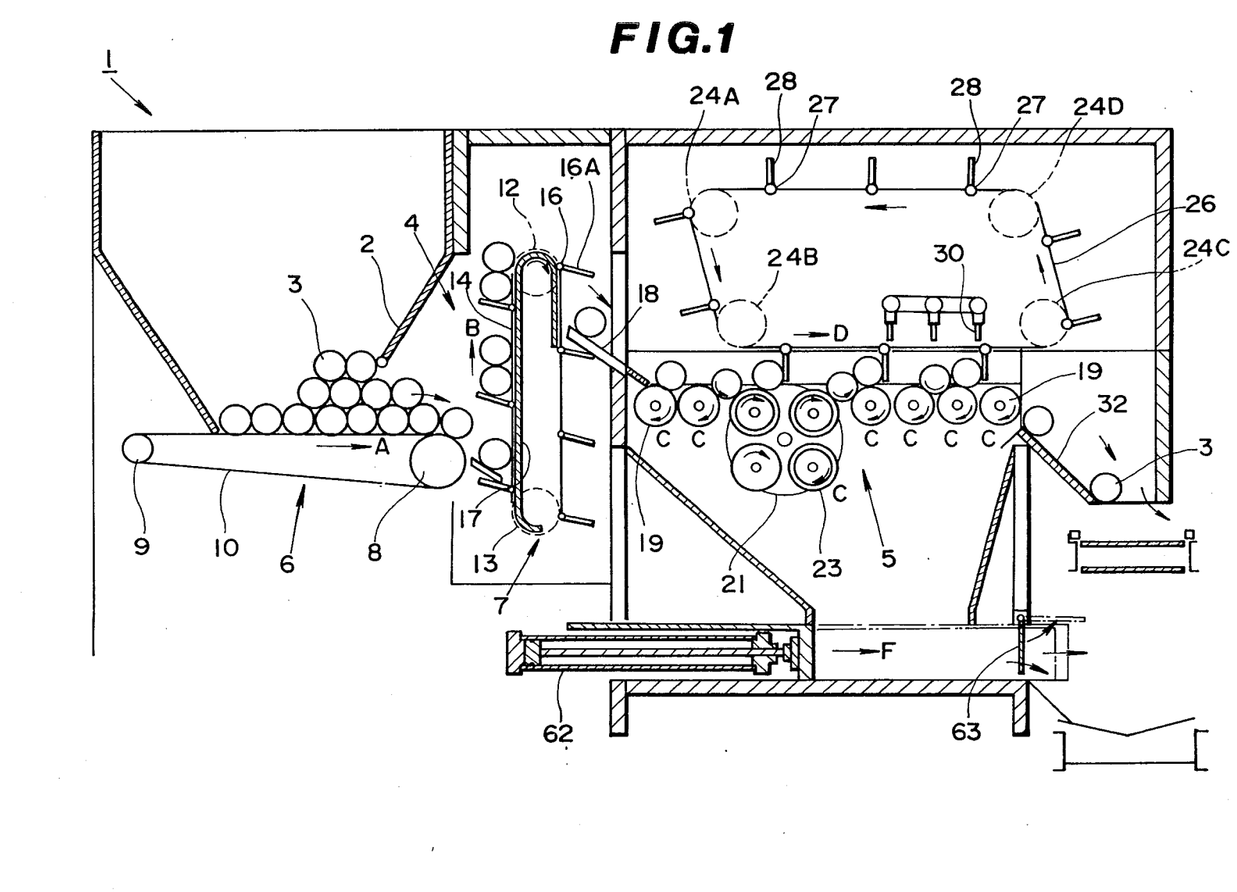
FIG. 1 is a schematic general side view showing the embodiment as partly sectioned.

As shown in FIG. 1, a (bulb) peeling apparatus of an embodiment is formed of a hopper 2 opening to be funnel-shaped in the bottom so as to be an inlet port for bulbs (which shall be described as of onions hereinafter), a conveying part 4 for conveying onions 3 on the bottom side of the hopper 2 at a proper speed and by a proper number and a peeling part 5 wherein slit-shaped incisions or incised grooves are made with rotary blades on the outer peripheral surface skins of the conveyed onions 3 while they are being conveyed forward in turn while being rotated and the grooved surface skins of the onions 3 are peeled off by blowing compressed air.

The above mentioned hopper 2 is made, for example, of steel and is painted with such paint harmless to foods as, for example, Sun First E three times on the inside.

Figure 2:
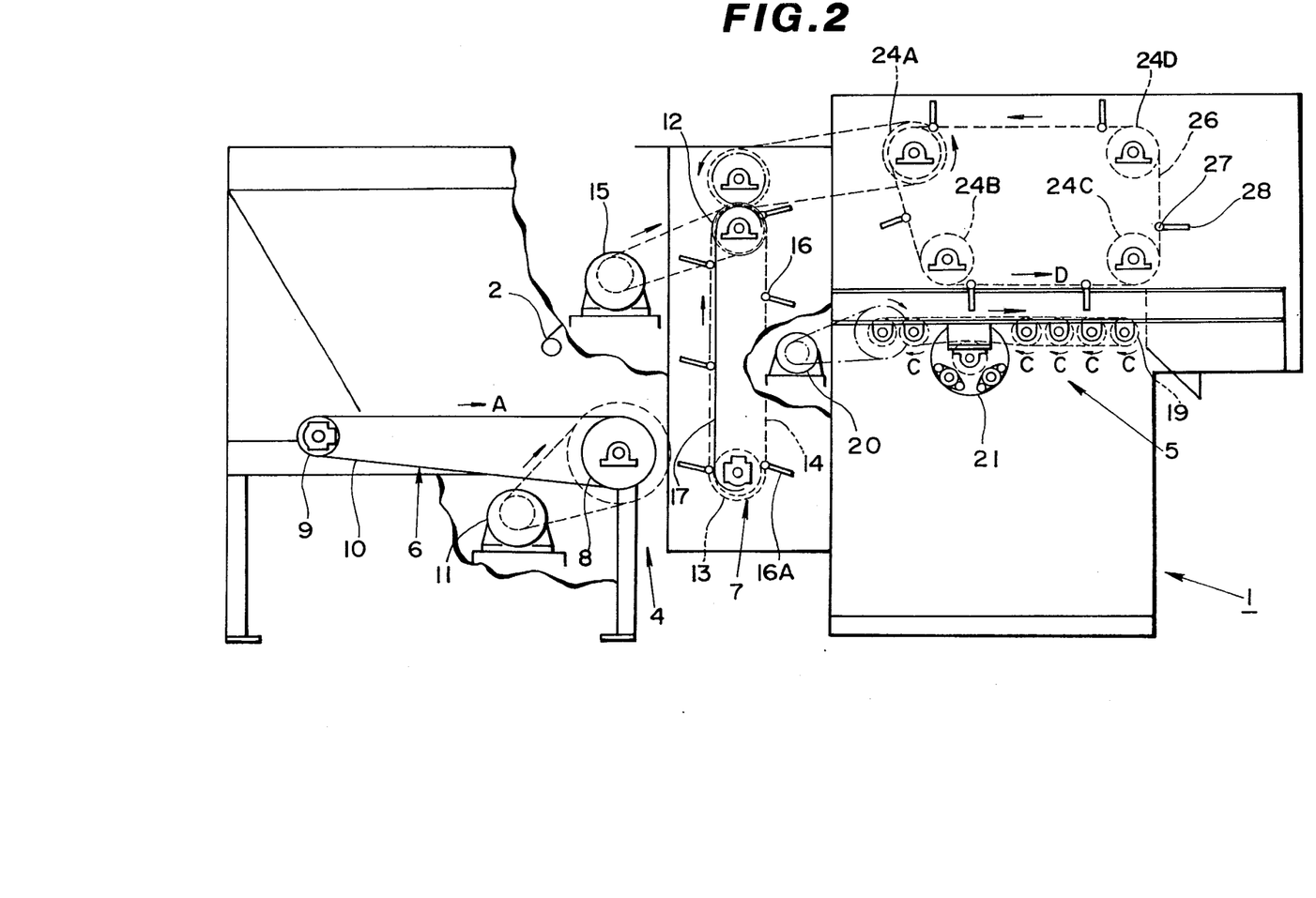
FIG. 2 is an explanatory view showing a driving system in FIG. 1.

The above mentioned conveying part 4 is formed of a first horizontal conveying part 6 in the horizontal direction and a second vertical conveying part 7 in the vertical direction. In the above mentioned horizontal conveying part 6, a belt 10 is hung substantially horizontally on pulleys 8 and 9 on both sides (only one side is illustrated) respectively in the front and rear of the bottom on which the hopper 2 opens and a belt conveyer in which one pulley 8 is rotated and driven by a motor 11 as shown in FIG. 2 is formed so that the respective onions 3 on the upper side of the hung belt 10 may be conveyed out forward (rightward in FIG. 1) as shown by the arrow A and may be conveyed to the vertical conveying part 7 provided adjacently in front of the pulley 8. In this case, the amount of conveying the onions 3 can be variably set by adjusting the stopping time and operating time with an operating timer not illustrated.

By the way, a belt material for foods is used for the belt 10.

On the other hand, in the above mentioned vertical conveying part 7, a roller chain 14 (the roller chains 14 are provided on both sides in the direction vertical to the paper surface, for example, in FIG. 1 but only one of them is shown in the illustration) is hung on sprockets 12 and 13 respectively on the upper side and lower side so that, when the upper sprocket 12 is rotated and driven by a motor 15, for example, as shown in FIG. 2, the roller chain 14 will convey the onions. A plurality of bars 16 are provided at predetermined intervals (in the direction of the roller chain 14) between the roller chains 14 on both sides. Many comb-shaped pawls 16A playing the role of shelves mounting the onions are fitted to the respective lateral bars 16. In case the roller chain 14 is fed out at a predetermined speed vertically upward as shown by the arrow B, the angle made by each pawl 16A with the feeding direction will be somewhat smaller than the right angle so that, even if too many onions are mounted at first, in case they are conveyed upward, they will drop and a fixed volume of onions 3 will be conveyed at a predetermined speed. By the way, a net 17 or the like is so provided that the onions 3 may not drop inside the roller chain. Further, the conveying speed of the above mentioned roller chain 14 is so set as to be able to be varied steplessly.

In the above mentioned vertical conveying part 7, in case the upward conveyed onions 3 are conveyed downward past around the outer periphery of the upper side of the sprocket 12, they will be conveyed into the front peeling part 5 by rolling on a sloped plank 18. By the way, the above mentioned plank 18 is formed to be comb-shaped as in the above mentioned pawls 16a on the rear end part side so that the respective pawls 16A may pass through the rear end side of the plank 18 without colliding. In the above mentioned peeling part 5, many rollers 19 are provided before and after they become belt-shaped in the horizontal direction on the lower side on which the onions are mounted and rotary saws 23 removably fitted to a fitting plate 21 and formed so as to slightly project blade 22 tips on the outer peripheries are arranged in the course of the rollers 19 rotated and driven as shown by the arrow C by a motor 20 shown in FIG. 2.

On the other hand, on the upper side of the peeling part 5, a roller chain 20 is hung on sprockets 24A, 24B, 24C and 24D arranged in four corners on each side and the sprocket 24A is rotated and driven, for example, by utilizing the above mentioned motor 15 as shown in FIG. 2 so that the roller chain 26 hung on the sprockets 24A, 24B, 24C and 24D will be driven as shown by the arrow D.

On the above mentioned roller chain 26, as on the roller chain 14 in the above described vertical conveying part 7, many comb-shaped pawls 28 are provided to project on lateral bars 27 (See FIG. 3 or 5) and there is formed a conveying regulating means wherein, when the respective pawls 28 are fed out at a predetermined speed together with the roller chain 26, in the horizontal belt-shaped part between the sprockets 24B and 24C, the onions 3 mounted on the rollers 19 or rotary saws 23 a little below the roller chain 26 and rotated and driven (in the direction reverse to the rotation of the rollers 19) will be conveyed out forward as indicated by the arrow D at a set conveying speed (carrying speed) as partitioned with lateral bars 27 which are adjacent in the forward and rearward direction. The above mentioned conveying speed is set in response to the speed at which the onions are conveyed in from the vertical conveying part 7. Also, the onions 3 conveyed from the rear by the adjecent pawls 28 so as to be partitioned at predetermined intervals in the above mentioned forward and rearward direction are regulated by it in the position so as not to go forward too much or it plays such role as of a stopper by which, in case the onions rotated in contact with the rollers 19, they will be retained within a set range.

By the way, the above mentioned pawls 28 are molded, for example, of urethane. The onions 3 are regulated by the guides 29 so as not to drop on both sides of the pawls 28 provided to project in the rightward and leftward direction.

Figure 3:
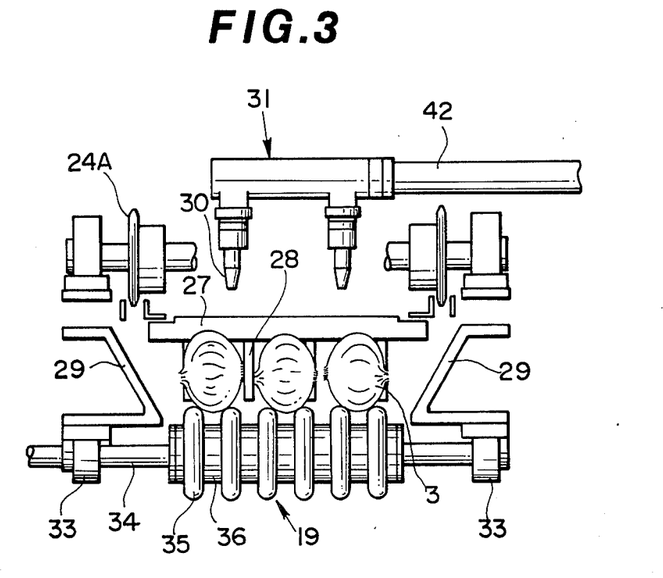
FIG. 3 is a schematic elevation showing a roller part as magnified.

Further, a jetting part 31 provided with many air nozzles 30 for jetting compressed air is arranged above the rollers 19 in front of the rotary saws 23, can be set in the position in the vertical direction steplessly as described later and reciprocates in the rightward and leftward direction at right angles with the forward and rearward direction at a set height so that the surface skins of the onions provided with incisions on the surface skins will be blown off downward by jetted compressed air and the onions having had the surface skins peeled off will be conveyed to the next step through a plank 32 from an outlet. As shown in FIG. 3, the above mentioned roller 19 is provided with a hole through which can be passed a rotary shaft 34 rotatably supported by bearings 33 arranged on both sides of the forward and rearward direction to be in the direction vertical to the paper surface and is formed by alternately overlapping and fitting disk-shaped members 35 molded to be round, for example, with a predetermined radius of curvature on the outer periphery and annular intermediate members 36 of an outside diameter smaller than of said disk-shaped member 35 and having a fixed thickness so that the onions 3 in frictional contact with the outer peripheral surfaces of the disk-shaped members projecting from the intermediate members 36 will be rotated in the direction reverse to the rotating direction of the rollers 19. As the projecting disk-shaped members 35 in the adjacent rollers 19 in the forward and rearward direction are arranged in the forward and rearward direction, almost all the onions 3 will rotate around the axis connecting the root side and stem side in contact with the disk-shaped members 35 projecting adjacently in the rightward and leftward direction as shown in FIG. 3 and the rotation will be stably succeeded to the rollers 19 adjacent in the forward and rearward direction or to the side of the rotary saws 23 where the blades 22 are arranged to project on the side of the intermediate members which become recesses in the adjacent rollers 19. By the way, the rotating speed of the rollers 19 or rotary saws is made higher than the speed of the pawls 28. Further, the rollers 19 are molded, for example, of urethane.

Figure 4:
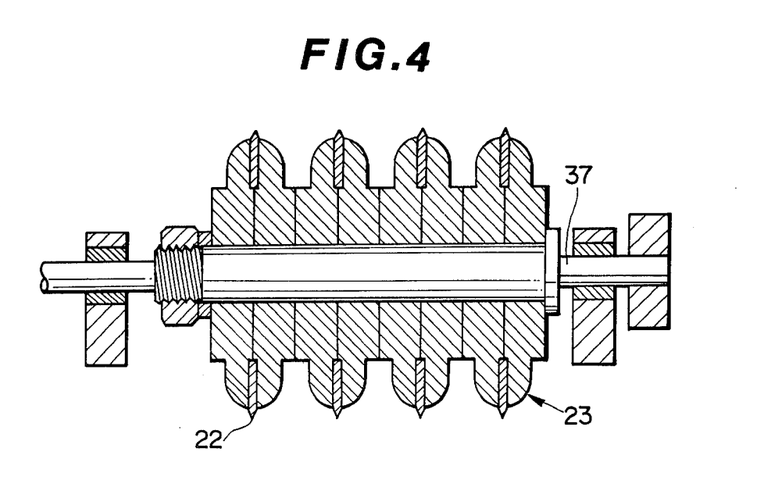
FIG. 4 is a schematic sectioned elevation showing rotary saws in FIG. 1 as magnified.

On the other hand, as shown in FIG. 4, the rotary saws 23 have a large fitting hole formed in the center and the blades 22 formed to make slit-shaped incised grooves or incisions on the outer peripheral surface skins of the onions in contact with the outer peripheries of the disks in case the rotary saws are rotated and driven are inserted each between two divisions of each thick disk-shaped fitting member, are fixed to project only in the blade 22 tip parts on the outer peripheries and are fitted as overlapped at fixed intervals equal to those of the case of the rollers 19 to a shaft 37 rotatably supported by bearings arranged on both sides vertical to the forward and rearward direction in the same manner as in the above mentioned rollers 19. For example, four of the above mentioned rotary saws 23 are fitted to the fitting plate 21 shown in FIG. 1 and two on the upper side of them are used to form slit-shaped incisions in the onions 3, by rotating the fitting plate 21 by 90 degrees, the other rotary paws 23 can be used as rotated to the upper side and, by removing the fixing nut or the like at the end, other rotary saws 23 different in the projecting parts at the blade 22 tips or the rollers 19 can be used by replacing them.

Therefore, when the rotary saws 23 of such different projections of the blade 22 tips as, for example, of 0.5, 0.95 and 1 mm. are fitted to the above mentioned fitting plate 21, the incising depth will be variable depending on the size of the onions 3.

Also, the blades 22 arranged at fixed intervals in the rightward and leftward direction can have the adjacent distance different.

The above mentioned blades 22 are molded of ceramics formed by sintering 95% $Al_2O_3$, 3% $SiO_2$, 0.5% $CaO$, 0.5% $Fe_2O_3$, 0.5% $Si$ and 0.5% of others. (Needless to say, any other metal than ceramics may be used.) The fitting members pressing the blades 22 are made of Teflon or Delrin.

Figure 5:
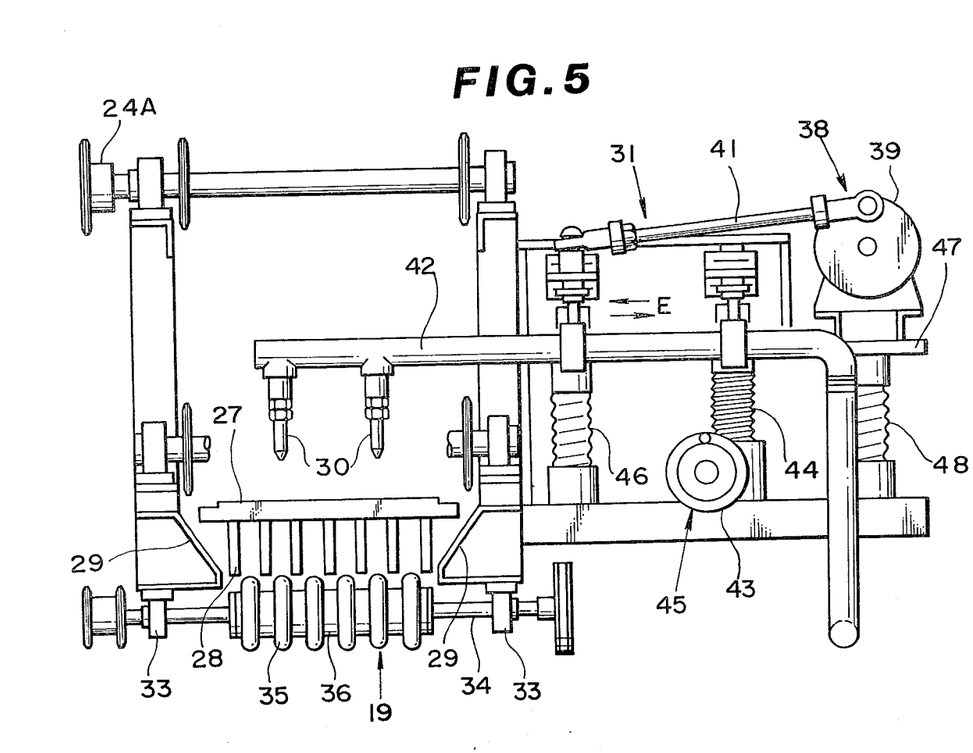
FIG. 5 is an elevation schematically showing the structure of a jetting part.

On the other hand, the jetting part 31 for blowing compressed air over the onions incised on the outer peripheral surface skins by the above mentioned rotary saws 23 to blow off the surface skins is formed as shown in FIG. 5.

That is to say, the rotary motion of a motor 39 is converted to the reciprocation of a connecting rod 41 by a cam mechanism 38. This connecting rod 41 is loosely fitted at the tip (the left end in the illustration) to the substantially central part of a pipe member 42 in which a compressed air passing path is formed. This pipe member 42 is reciprocated in the rightward and leftward direction (which is the direction of both sides of the forward and rearward direction in which the onions 3 are conveyed) indicated by the arrows E. Compressed air is jetted downward from air nozzles 30 formed to project, for example, in six places on the lower side on the periphery of the tip part of this pipe member 42. (Two air nozzles not illustrated are provided respectively on both sides of the vertical direction of the air nozzles 30 on the paper surface). An elevating mechanism is formed to make it possible to steplessly adjust the height (that is, the distance from the onions) of the pipe member 42 fitted with the nozzles 30 on the tip side.

That is to say, as shown in FIG. 5, a screw jack 45 (which is not limited to the screw jack 45 but may be a rack driving jack using a rack or hydraulic jack) is formed to steplessly, that is, continuously vary the height of the horizontal part of the above mentioned pipe member 42 by elevating or lowering it in the part somewhat on the hand side from the middle part with an elevating screw 44 meshing with a screw fixed to or formed in a center shaft of a rotary handle 43. In order that the horizontal part of the pipe member 42 may not tilt in case the above mentioned pipe member 42 is steplessly elevated or lowered, the pipe member 42 in the position in which the above mentioned connecting rod 41 is fitted at the tip is supported on the lower side with a bellows-shaped member 46 guided by an inside member and movable in the vertical direction on the outer periphery of the inside member. In the same manner, a mounting base 47 in the cam mechanism 38 is also supported by a bellows-shaped member 48 having the same function.

Figure 6:
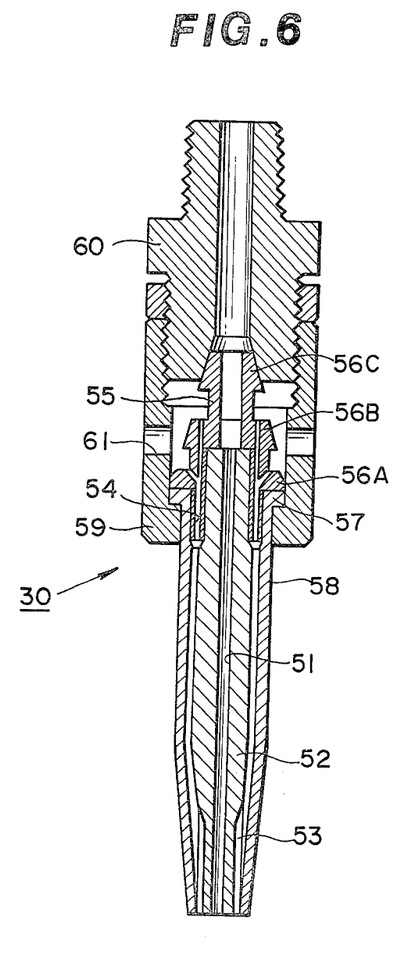
FIG. 6 is a sectioned view showing the structure of an air nozzle.

On the other hand, the above mentioned air nozzle 30 is formed as in FIG. 6.

That is to say, the outer peripheries of the base end side and tip side of an inner tube 52 in which a through hole 51 to be a compressed air path is formed in the center are made smaller in the diameter. Many fine vertical grooves 53 are formed in the axial direction on the outer periphery of this tip side so that air on the peripheral side coming in through the vertical grooves 53 as sucked in by a compressed air flow delivered from the tip port through the through hole 51 may be delivered while covering the outer periphery of the above mentioned compressed air flow.

The above mentioned inner tube 52 is fixed on the base end side by being pressed in or the like to a front end opening of an air sucking member 55 provided with an inner hole communicating with the above mentioned through hole 51 and with air sucking holes 54 in several places on the outer periphery of the above mentioned inner hole. This air sucking member 55 has flange parts 56A, 56B and 56C formed in three places by incising the outer periphery of a cylindrical member so as to be smaller in the diameter rearward. The above mentioned flange part 56A to be of the largest outside diameter is formed to be equal in the outside diameter to a flange part 57 of an outer tube 58 provided with an inside diameter fitting to the base end side of the above mentioned inner tube 52 and having the flange part 57 formed on the outer periphery of the end part.

The holes 54 provided in the above mentioned air sucking member 55 are branched in the course to open on the rear end side surface of the flange part 56A and the rear end side surface of the flange part 56B so as to suck in air on the outer periphery of the flange part 56B.

The above mentioned inner tube 52 and outer tube 58 fitted to it are fixed as held and pressed by screwing a tubular fixing member 59 to a fitting member 60 provided with a hole along a center axis. Several holes 61 are formed on the outer periphery near the middle of the side part of the above mentioned tubular fixing member 59 and the air gap part on the outer periphery of the above mentioned flange part 56B is made to communicate through the holes 61 so that air sucked into the holes 54 from the opening ends located on the rear end surfaces of the flange parts 56A and 56B may be fed. The air sucked in through the holes 54 will be led to the above mentioned vertical grooves 53 through the space between the outer periphery of the inner tube 52 and the inner periphery of the outer tube 58.

A female screw is formed on the inner periphery of the rear end of the above mentioned fixing member 59 and is screwed to a male screw formed on the outer periphery on the front end side of the fitting member 60 so as to be removably fixed. Further, a male screw formed on the outer periphery on the rear end side of the fitting member 60 can be fitted to the pipe member 42. The compressed air fed through the pipe member 42 will be led to the through hole 51 of the inner tube 52 through the hole within the fitting member 60 and further through the hole within the air sucking member 55 fitting in the flange part 56C at the rear end with the fitting member 60 so as to form a flowing path for compressed air to be delivered from the tip of the through hole 51. The compressed air will be delivered through this path. As a means of preventing the delivered air from being gradually expanded by the resistance of (substantially stationary) surrounding air and being quickly reduced in the speed, an air flowing path is formed around the side of the compressed air flowing path so that an air flow flowing as sucked by the flow of the above mentioned delivered compressed air may be formed and the delivered compressed air may be jetted without being substantially subjected to the resistance. That is to say, a jetting means whereby compressed air is delivered strongly forward without being so much subjected to the resistance of air is formed.

By the way, below the rollers 19 is made a trash box for containing the surface skins of the onions 3 so that, when a sliding member 62 provided on the rear side of the bottom is pressed forward as indicated by the arrow F, the sliding member 62 will slide to the forward position indicated by the imaginary lines and will rotate, push up and open with the front end surface a lid 63 closing a discharging port and the surface skins will be able to be discharged.

The above mentioned embodiment is contained in a box-shaped container to reduce the noises of the motors 11 and 15 and others and to prevent dust and the like from being mixed in.

By the way, in the above mentioned embodiment, members made by painting steel or the like in several layers as described above are used for the metal parts.

The operation of the thus formed embodiment of the present invention shall be explained in the following.

When many onions 3 put into the hopper 2 are conveyed forward in the horizontal direction as mounted on the belt 10 in the horizontal conveying part 6, are further conveyed upward at a set conveying speed as nounted on the pawls 16A in the vertical conveying part 7 and are then conveyed into the peeling part 5 through the plank 18, the onions 3 conveyed into the peeling part 5 will contact the rollers 19 rotated and driven as indicated by the arrows C and will be rotated in the reverse direction by the friction with the contacted rollers 19. These rotated onions 3 will be conveyed out forward as indicated by the arrow D as regulated in the position at a predetermined speed as partitioned in the volume at predetermined intervals by the pawls 28 provided to project on the lateral bars 27 provided between roller chains 26 on the upper side. As the rotary saws 23 are arranged in the course of the above mentioned rollers 19, the onions 3 conveyed while being rotated by the rollers 19 in front will be incised on the surface skins in contact with the tips of the blades 22 projecting on the outer peripheries of the rotary saws 23 by the blade 22 tips and will be rotated in the direction reverse to that of the rotary saws the same as in the rollers 19 in front by the friction with the fitting members adjacent to the blade 22 tips and therefore incisions will be made over the outer peripheries of the surface skins.

The thus incised onions 3 will be conveyed in turn to the side of the rollers 19 arranged in front. In such case, the surface skins will be peeled off downward by compressed air jetted out of the air nozzles 30 in the above. In this case, as the incisions are made on the outer peripheries of the onions 3, the jetted air will enter the insides of the surface skins through the incisions, the surface skins will be separated or become easy to separate and therefore, (without the need of jetting air toward specific positions to be on the stem sides of the onions 3) by only jetting air on any outer peripheries of the onions 3, the surface skins will be able to be positively blown off or peeled off. In this case, as the onions 3 are being rotated, the peeling will be able to be made more effectively than in the case of conveying the onions without rotating them. Also, as the peeling time can be reduced, a large volume of onions will be able to be peeled at a high speed or within a short time.

In the above mentioned case, as the air nozzles 30 of such structure that the compressed air flows jetted out of the nozzles 30 will not become so weak as to suck in surrounding air are used, the peeling will be made at a higher speed and more positively.

The onions 3 having thus had unnecessary surface skins peeled off or removed will roll down the plank 32 and will be conveyed to the next step.

On the other hand, the above mentioned surface skins blown off or peeled off will be contained in the trash box below the rollers 19 and will be able to be discharged out of the discharging port by pressing the sliding member 62 as indicated by the arrow F.

Therefore, after the conveying speed (of the belt 10) in the horizontal conveying part 6, the conveying speed (by the pawls 16A fitted through the lateral bars 16 to the roller chains 14) in the vertical conveying part 7, the rotating speed of the rollers 19 in the peeling part 5 and the conveying speed of the pawls 28 fitted through the lateral bars 27 to the roller chains 26 are set at optimum values in response to the sizes of the onions 3, when the onions 3 are only put into the hopper 2, the peeled onions 3 wil automatically come out of the outlet.

By the way, the conveying means in the present invention includes not only the horizontal and vertical parts of the conveying part 4 but also the conveying means in the peeling part 5. In the above mentioned embodiment, the conveying part 4 is so formed as to convey them in the horizontal and vertical directions but, needless to say, the invention is not limited to it. For example, it may be formed as to convey them along a slope.

Also, the jetting part 31 in the peeling part 5 is not limited to the air nozzles 30 provided in three places in each of two rows in the forward and rearward direction as in the above mentioned embodiment. Also, the reciprocating direction of the air nozzles can be made different from that of the above mentioned embodiment. For example, even if many air nozzles 30 are arranged in the rightward and leftward direction and are reciprocated in the forward and rearward direction, they will be able to be made to function substantially the same. They may be reciprocated in a direction inclined to the forward and rearward direction.

By the way, in case many air nozzles are arranged along the rightward and leftward direction, even if they are not reciprocated, the surface skins will be able to be well peeled off, Further, even if the blades 22 of the rotary saws 23 are fitted as inclined instead of being vertical to the shaft 37 and are made to spirally incise the surface skins of the onions 3, the onions 3 will be able to be well peeled.

The outer peripheral surfaces around the blades 23 of the fitting members holding the blades 22 of the rotary saws 23 are so formed as to be rotated by the friction acting on the parts in contact with the outer peripheries of the onions 3. However, in order to make them easy to rotate and drive, the outer peripheral surfaces around the blades 22 may be made rough or may be provided with such concavoconvexes as are formed on the outer peripheries of tires.

By the way, the above mentioned embodiment is described by exemplifying the onions 3 but can be applied the same also to such bulbs as of garlics.

As described above, according to the present invention, incisions to make surface skins easy to peel off are made on the outer peripheral surfaces of conveyed bulbs. Therefore, in case the surface skins are to be peeled off by jetting air, the surface skins will be able to be peeled off positively within a short time irrespective of the directions of the bulbs. In case a large volume of surface skins must be peeled off, the present invention will be very effective.

It is apparent that working modes different in a wide range can be formed without deviating from the spirit and scope of the present invention. The present invention is not limited to any specific working mode except being limited in the appended claims.

I claim:

1. A bulb peeling apparatus for peeling skins off bulbs, comprising:
   means for conveying bulbs along a predetermined path at a variable speed;
   means for setting said variable speed;
   means for rotating the bulbs as they are conveyed along said path;
   means for inscribing grooves on the outer peripheries of the bulbs, said inscribing means also causing the bulbs to be rotated when in contact therewith;
   means for directing jets of air onto the grooved bulbs, such that the skins of the bulbs are peeled off; and
   means disposed near said predetermined path, including said inscribing means, and engageable with the bulbs for loosely regulating the positioning and the speed of the bulbs on said conveying means.

2. The bulb peeling apparatus of claim 1 wherein said inscribing means comprises rotary saws having blade tips on the disc-shaped periphery thereof.

3. The bulb peeling apparatus of claim 1 wherein said directing means is spaced a set distance away from the bulbs, said directing means being adjustable to vary said set distance.

4. The bulb peeling apparatus of claim 1 wherein said conveying means is formed of roller parts which convey the bulbs along the predetermined path while also causing them to rotate about the axis connecting the root and stem of each bulb.

5. The bulb peeling apparatus of claim 2 wherein said inscribing means comprises a plurality of said rotary saws removably attached to a rotatable fitting plate, said fitting plate being adapted to accomodate rotary saws having different projecting blade tips such that different rotary saws may be employed by rotating said fitting plate.

6. The bulb peeling apparatus of claim 3 wherein said directing means is reciprocable.

7. The bulb peeling apparatus of claim 1, wherein said regulating means includes,
   a plurality of comb-shaped pawls for contacting the bulbs and regulating their speed and positioning,
   a plurality of support bars, one each for supporting each of said pawls,
   a chain means parallel to said predetermined path for holding said support bars in place and conveying the same parallel to said predetermined path.

8. The bulb peeling apparatus of claim 2, wherein each rotary saw includes a plurality of blade tips.

9. The bulb peeling apparatus of claim 8, wherein each rotary saw comprises a plurality of rotary discs centered on the axis of rotation of said rotary saw, each disc containing blade tips extending axially outward from the peripheries thereof, said discs being spaced apart from each other at an optimum distance for inscribing the necessary grooves in the bulbs for proper peeling thereof.

10. The bulb peeling apparatus of claim 9, wherein the periphery of each of said discs forms a shoulder which supports the bulbs as well as providing a regulator to regulate the depth of the grooves inscribed in the bulbs.

* * * * *